United States Patent [19]

Kupf et al.

[11] 4,295,628
[45] Oct. 20, 1981

[54] MOLD FOR THE INJECTION MOLDING OF OBJECTS OF LARGE DIMENSION AND COMPLICATED SURFACES FROM PLASTIC MATERIAL

[75] Inventors: Lubomir Kupf, Prague; Jiri Travnicek, Celakovice; Radomil Adámek, Pardubice; Josef Kyzlink, Brno, all of Czechoslovakia

[73] Assignee: Statni vyzkumny ustav materialu, Prague, Czechoslovakia

[21] Appl. No.: 93,130

[22] Filed: Nov. 9, 1979

[51] Int. Cl.² .............................................. B29C 5/00
[52] U.S. Cl. ............................. 249/80; 249/79; 249/103; 249/160; 149/142
[58] Field of Search ............... 249/79, 80, 81, 102, 249/103, 104, 140

[56] References Cited
U.S. PATENT DOCUMENTS

| | | | |
|---|---|---|---|
| 2,330,277 | 9/1943 | Fritschle | 249/79 |
| 2,907,070 | 10/1959 | Van Haitesoeldt | 249/80 X |
| 2,972,778 | 2/1961 | Wikkerink | 249/103 |
| 3,061,880 | 11/1962 | Weisbach | 249/104 |
| 3,173,175 | 3/1965 | Lemelson | 249/80 X |
| 3,354,509 | 11/1967 | Ammondson | 249/103 X |
| 3,380,121 | 4/1968 | Chittenden et al. | 249/104 X |
| 3,536,290 | 10/1970 | Terry | 249/103 |
| 3,723,584 | 3/1973 | Nussbaum | 249/80 X |
| 3,883,109 | 5/1975 | Hahne | 249/140 X |
| 3,999,917 | 12/1976 | Knowles | 249/79 X |
| 4,088,295 | 5/1978 | Medovas et al. | 249/79 |

*Primary Examiner*—J. Howard Flint, Jr.

[57] ABSTRACT

Mold for the injection molding of objects of large dimension and complicated surfaces from plastic material without internal stresses and with accurate dimension. In base plates of the mold cooling grids are embedded and the active surface of the base plates is provided with forming plates and forming strips with grooves for heating elements or tempering and cooling means. The mold is provided with mobile cores which change their positions in the course of shrinking of the solidifying plastic material.

13 Claims, 13 Drawing Figures

MOLD FOR THE INJECTION MOLDING OF OBJECTS OF LARGE DIMENSION AND COMPLICATED SURFACES FROM PLASTIC MATERIAL

BACKGROUND OF THE INVENTION

The invention relates to a mold for the injection molding of objects of large dimensions with complicated surfaces from plastic material, such as plates, filter elements, bearing plates, and the like.

Molds for the manufacture of injection molded articles of large dimension are acutally made in the shape of a compact steel block, particularly as a cast or forged piece, which is worked to the required shape by machining. Openings for a cooling medium are bored into the steel block. The hollow space for injection of the plastic material is shaped in the same manner in the active part of the mold. In the technology of the structural injection molding of plastic materials, lower closing forces are used with some modifications, due to lower injection pressures that are required with respect to conventional injection molding wherein a melt of plastic material is charged into the mold. Thus it is possible to use for the mold castings of alloys oflight metals, for instance aluminum, which have a more advantageous heat conductivity than steel. A drawback of such molds, however, is the easy vulnerability of their active surfaces due to the lower hardness of the materials used.

The technology of manufacture of molds of large dimensions is very demanding. Forgings or castings require complicated machine tools for the working of all details of the construction, particularly spcial copying machines and the like. The necessity of using working tools of small dimensions substantially prolongs the time required to manufacture molds and thus also substantially increases their cost. The required shapes need both special tools and machines which are frequently not available. Thus the part of manual working on the molds increases, leading to prolonged manufacturing times, which may even amount to more than a year. Due to high costs of manufacture of the molds, it is frequently impossible to make use of some economically advantageous applications of plastic materials. Another obstacle, in the case of a rented mold manufactured at high cost, the high cost of time for the use of the mold may prevent experimentation in case of innovations in injection moldings which might be produced in the mold.

Another obstacle is the requirement of a substantial capacity of large tool plants, what can be practically solved only by costly investments.

The construction of cores of molds for the conventional injection molding of plastic materials has a number of drawbacks. There is primarily a firm connection of the cores with the mold capacity or the possibility of shifting of the cores in the mold only in the direction of the core axis. As a consequence thereof, due to the contraction forces of the cooling down melt of plastic materials, high stresses are generated in the molding, particularly in the neighborhood of the cores. In the technological process therefore, the cast is removed from the still not fully cooled mold, or the core is, in a certain moment in the course of cooling, pulled in the cirection of its axis into the internal part of the mold. These steps have the drawback that, during the following cooling down, deformations of the shape of the molding and changes of its dimensions occur, thus endangering the reproductibility of the moldings. These influences become particularly evident with moldings of large dimensions, where even a destruction of the molding may occur so that compromises have to be made in the design, or openings and recesses in the molding have to be additionally provided. This is particularly true with structural injection molding, wherein usually large dimensions and different structures of surface and internal layers of the molding are present and wherein additional working should be eliminated.

In the case of the majority of applications of injection molding of articles of large dimensions, a corrosion of the mold under stress can occur within a short time interval, the cause of which are local stresses in the mold in the neighborhood of the cores. Their prevention in molds producing moldings of large dimensions is practically impossible. The elimination of the causes of these stresses has therefore a substantial importance for the life time of the molds. The sole solution as to how to prevent the generation of stresses and of deformations of the molds is to provide for the movement of cores in the course of the shrinkage of the plastic material.

SUMMARY OF THE INVENTION

It is an object of this invention to eliminate or at least to reduce the above-mentioned drawbacks and to provide a mold wherein stresses due to shrinkage of plastic materials in the course of their cooling can be reduced and moldings of complicated design can be produced at substantially reduced costs.

The mold according to this invention comprises a metal base plate with circumferential strips. Cooling grids consisting of cooling tubes are cast into the metal base plate. The active part of the mold is made up of forming plates and forming strips, removably fixed to the upper surfaces of the base plate as by means of screws. The heads of these screws are flush with the active surface of the forming plates and forming strips, and have on their upper active surfaces the same pattern as the adjacent active surfaces of the forming plates and forming strips.The base plate is provided with bolts supporting mobile cores. The lower wall of the forming plates and forming strips is provided with grooves for heating elements or for a tempering medium, and with grooves for an auxiliary cooling system.

The mobile core of the mold is slipped on a bolt for the core; such bolt may be a fixing bolt situated in a cavity of the core body and fixed to the mold, the diameter of the fixing bolt being smaller than the cavity of the core body. A space for shifting the core body along the base plate of the mold is provided between the fixing element and the internal wall of the core body. A resilient element, for instance a rubber layer or a steel spring, can be arranged between the fixing bolt and the cavity of the core body.

The slidable connection of the core body with a wall of the mold may be accomplished by a fixing bolt in the shape of a screw bolt, under the head of which a washer is provided.

The fixing bolt can be situated in the cavity of the core body eccentrically in the direction opposite the movement of the molding in the case of shrinking, and can be provided with a distance bolt, the end of which rests against the internal wall of the core body. The mobile core can be furthermore fixed to a fixing bolt by a steel spring or can be suspended on the fixing bolt by a steel spring, which can be replaced by a permanent magnet. The mobile core can be also fixed by a resilient element resting against the edge of the mold.

The mold according to this invention is capable of molding a number of products with complicated patterns on their active surfaces. In case of the application of some progressive technology for manufacture of details of the construction, such as electrochemical working for the manufacture of forming plates ans forming strips, it is possible to realize in the course of manufacture of the mold quite new advantages from the point of view of saving time and costs and to realize novel designs of active parts from plastic materials, which can not be achieved by the application of conventional technologies for the manufacture of molds.

The mobile cores provide conditions for use in many applications, which could not be achieved with conventional means: manufacture of geometrically demanding shapes with accurate dimensions without the requirement of additional final working. The high quality of moldings without internal stress and deformations also permits proposals of complicated arrangements in machinery and other branches, where specific properties of plastic materials used for large moldings are utilized to the maximum. The economical efficiency which this solution yields is not only in the creation of conditions for the proper realization of highly demanding castings, but also in the saving of possible final operations, in the prolongation of the life time of moldings and the widening of the creative field for designers. In addition, the stress and wear of the mold in the neighborhood of the cores is substantially reduced. The main advantages of the design of the mold according to this invention are in the possibility of improvement of technological conditions in manufacture of moldings from plastic material. This is particularly important in the manufacture of parts of plastic materials by the technology of structural injection and of their modification. It is, for instance, known that in the technology of "quick injection" the surface obtained is not so smooth as with the conventional technology. By quick preheating of the surfaces of the active parts of the mold just prior to injection and following quick cooling of the mold a substantially smoother surface can be obtained together with the possibility of application of rather complicated patterns on the casting.

Another advantage is the possibility of manufacture of plates, strips, forming parts of the mold and cores from special steels, for instance nitrited steels and the like in order to obtain resistivity to corrosion with high surface resistivity. In addition, further surface adjustments can be easily made on the details of the active surface, as for instance sand spraying and provision of anticorrosive and antiadhesive coatings. These may include, for instance, a coating of polytetrafluorethylene on the base—for an easy removal of the casting from the mold; this could not be practically accomplished on a compact mold due to its dimensions.

For the manufacture of active plates it is possible to apply the technology of electrochemical working, which is very productive and enables in addition the creation of shapes by means of an electrode, which can be realized only with difficulty with other technologies. For instance, the making of several thousands of blind openings of the shape of truncated pyramids of a surface of several square millimeters would be rather troublesome. When applying the mentioned technology the manufacturing time of 32 pieces of plates of a size 200×200 mm is 8 hours. On the opposite side of the plates the optimum shape of grooves and recesses for a cooling liquid or a tempering medium or for a heating element can be created. The heads of fastening screws have their heads formed in the same pattern as the forming plates and the forming strips simultaneously with their electrochemical working. In addition to the above-mentioned advantages, it is also possible to achieve significant contributions from the point of improvements of technological conditions, as, for instance, the solution of deaeration of the cavity of the mold and also the removal of the molding from the mold by air, a particular heat condition of the mold with local differences, and the like.

Molds for moldings of large surfaces and large dimensions designed according to this invention substantially reduce manufacturing costs and manufacturing times, which according to the character and complexity of the mold can be for 50 to 70% lower and shorter, respectively.

Another advantage is the easy exchangeability of a part of the mold which is damaged; this can be accomplished without removal of the mold from the press. For molds of large dimensions this operation up to now has been rather difficult.

The core of the mold is particularly shiftable in directions perpendicular to its axis and in the directions of the forces acting upon it due to shrinking of the solidifying plastic material in the mold. The core can, however, prior to filling of the mold by the melt be fixed in a position opposite to the direction of shrinking, this position being secured by a spring loaded distance bolt or by a resilient insert.

DESCRIPTION OF THE DRAWINGS

Examplary embodiments of the mold according to this invention are shown in the accompanying drawings wherein.

DESCRIPTION OF PREFERRED EMBODIMENTS

Figure 1:
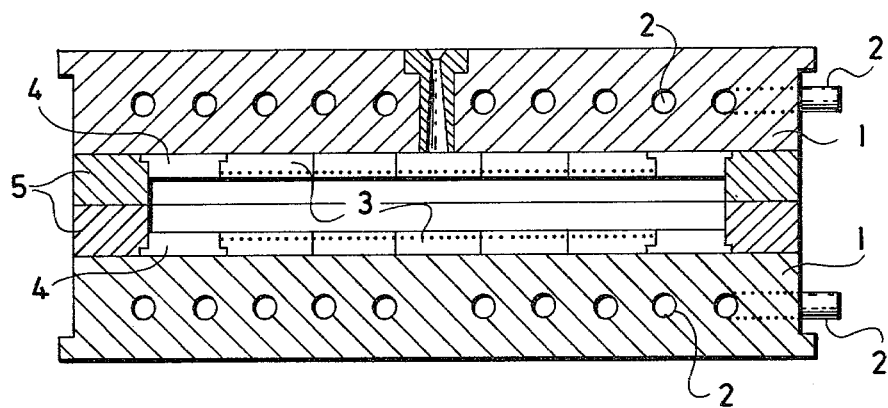
FIG. 1 is a view in section of an assembled mold.

Turning now to FIG. 1, the mold for the manufacture of injection moldings from plastic material there shown is for the making of large plates for filter presses. Such plates have, forexample, a square shape with a dimension of 1200 mm on each side and a thickness of 250 mm. The lower and upper base plates 1 of the mold (the positive and negative matrices) are each provided with cooling grids of welded steel tubes 2. The cooling grids are cast into the base plates 1, for which advantageously aluminum alloys are used, in the course of their casting. The borders of the cavity of the mold are defined by strips 5, between which strips 5 suitably shaped forming strips 4 and forming plates 3 are fixed; the thickness of strips 4 and plates 3 does not exceed 12 mm. An insert for the inlet of plastic material is provided in the center of the mold in the upper negative matrix plate 1.

Figure 2:
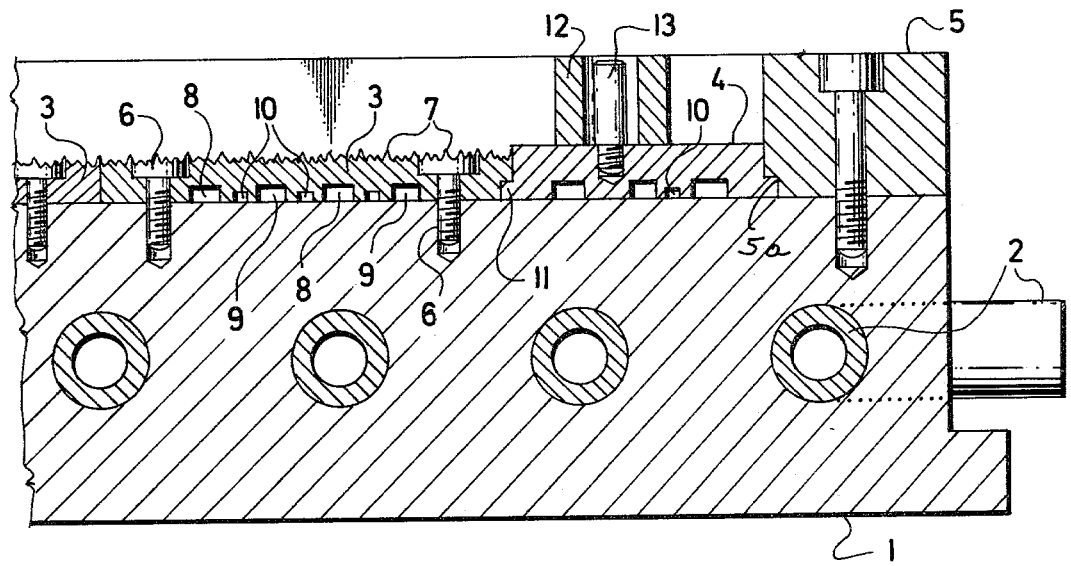
FIG. 2 is a view in section of a part of a matrix of the mold of FIG. 1 with a diagrammatically indicated core.

As shown in FIG. 2, the lower positive matrix comprises a base plate 1, to which circumferential strips 5 are screwed and secured by bolts. Strip 5 has a recess 5a which affixes to the base plate 1 a circumferential shape forming strip 4 together with the forming plate 3, which is provided on one side with a recess 11. The forming plate 3 is fixed to the base plate 1 by a screw 6 which has formed on its head the same pattern as is formed on the active surface of the forming plate 3. The pattern comprises a system of shapes which form during the injection molding a draining system limited by prismatic extensions of a dimension 8×8 mm and a height of 4 mm, the extensions being slightly conical, so that the thus formed grooves have the shape of an open trapezohedron with a longer base of 4 mm. The face wall of the extensions is provided with additional grooves of a width of 1.5 mm and a depth of 1 mm. The active surfaces 7 of the forming plates 3, screws 6, and forming strips 4 are provided with a coating of polytetrafluorethylene 0.03 mm thick and their surfaces facing the base plate 1 are provided with grooves 8 for receiving heating elements or a tempering medium and with grooves 9 for an auxiliary cooling system. The external space around the grooves 8 and 9 is separated by a packing 10, advantageously made of rubber with a circular cross section. When applying the technology of electrochemical working, a particularly optimum design of grooves 8 and 9 of a tempering and cooling system having a maximum efficiency can be achieved. A fixing bolt 13, serving for fastening the body 12 of the core is anchored in the lower base plate 1.

FIGS. 3 to 13, incl., illustrate a number of alternative arrangements of cores and of the manner of securing the mobile cores in the mold.

Figure 3:
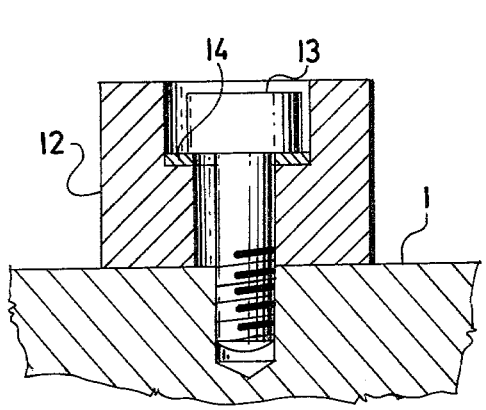
FIG. 3 is a view in section of a first alternative embodiment of a core of the mold provided with a fixing screw bolt.

In FIG. 3 there is shown a core for the creation of an opening in the wall of the injection molding. The core comprises a mobile core body 12, in the internal formed hollow space of which there is a fixing bolt 13, bolt 13 being a screw bolt. The head of the screw bolt 13 is seated on an internal formed wall of the core body 12 by way of a washer 14. The diameter of the forming bolt 13 is smaller than the hollow of the core body 12 so as to provide a space, for the shifting of the mobile core body 12, between the eccentrically situated fixing bolt 13 and the internal wall of the core body 12. The core body 12 is only slightly tightened to the base plate 1 by the fixing bolt 13, permitting its movement due to the shrinking of the solidifying plastic material, whereby the core body 12 is shifted along the surface of the mold and along the washer 14 of the fixing bolt 13.

Figure 4:
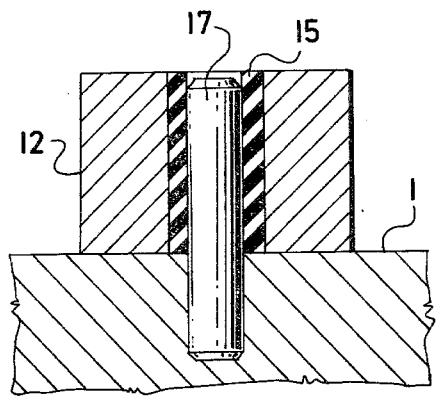
FIG. 4 is a similar view of a second alternative embodiment of a core with the space between the hollow core and a centering bolt filled by a resilient insert.

In FIG. 4 there is shown a core for a mold having a small shrinkage of the injected plastic material. Such mold has a mobile core body 12, in the central hollow space of which there is disposed a fixing or centering bolt 17 firmly connected to the base plate 1. The space between the centering bolt 17 and the internal wall of the core body 12 is filled with a resilient insert 15 of foamed rubber. The thickness of the wall of the resilient insert 15 is chosen according to the required shrinking.

Figure 5:
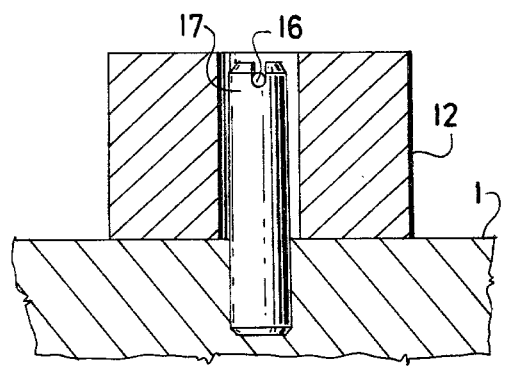
FIG. 5 is a similar view of a third alternative embodiment of a design of a core provided with a centering bolt.
Figure 8:
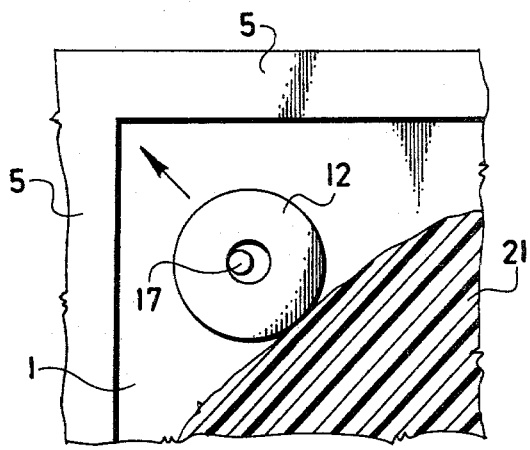
FIG. 8 is a top view of the core after the mold has been filled with plastic material and such material has cooled somewhat.

In the embodiment of FIGS. 5 and 8 the core of the mold with a mobile core body 12 has in the central hollow space of the core body 12 a fixing bolt 17 fixed to the base plate 1. The centering bolt 17 is provided on its top with a recess, into which a guiding 16 is engaging, enabling to retain the direction of movement of the core when the melt of plastic material enters the mold. The core of the mold can be partly shifted in directions perpendicular to its axis and in directions of forces acting due to shrinkage of the solidifying melt 21 of plastic material, (limited, of course, by the circumferential strip 5) as shown in FIG. 8.

Figure 6:
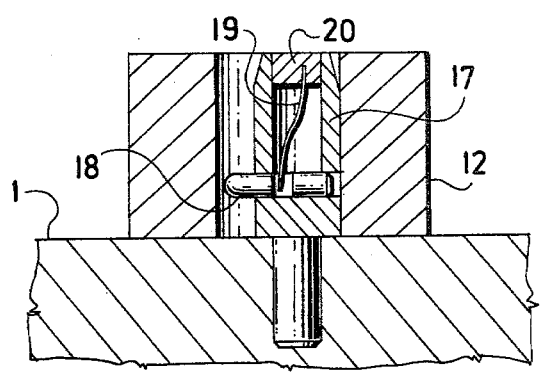
FIG. 6 is a similar view of a fourth alternative embodiment provided with an eccentrically situated spring loaded distance bolt.
Figure 7:
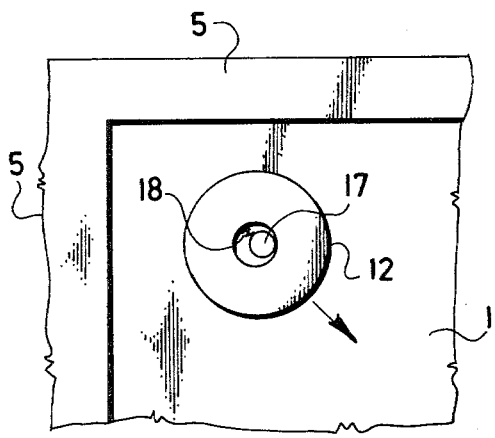
FIG. 7 is a top view of the core of FIG. 6 arranged on a mold.

The core of the mold according to the embodiment of FIGS. 6 and 7 is designed for larger shrinkages of the plastic material and for rectification of the direction of shifting of the core body 12 along the base plate 1. In the central hollow space of the core body 12 there is provided a fixing bolt in the form of a centering bolt 17 affixed to the wall of the mold. The centering bolt 17 is situated eccentrically in the hollow of the core body 12 and is provided with a spring loaded distance bolt 18, the end of which rests against the internal wall of the core body 12. The distance bolt 18 is adjusted in a direction opposite to that of the action of the shrinking plastic material. A flat spring 19, which engages a groove in the distance bolt 18, is anchored in a cover 20 for the centering bolt 18. The flat spring 19 permits a sufficient shifting of the mobile core body 12 due to its adjustment against the direction of shrinkage whereby the core can be better fixed in the mold. The core can be shifted along the base plate 1, limited by the circumferential strip 5.

Figure 9:
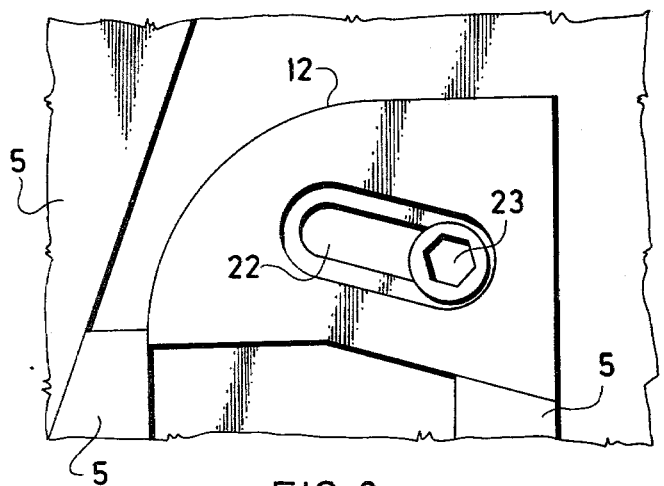
FIG. 9 is a top view of a fifth alternative mobile part of a mold provided with an eccentrically situated fixing bolt represented by a set screw.

FIG. 9 shows a core as a removable part of the mold, the core forming the required recess in the injected casting. The mobile core body 12 is provided with a slot 22, permitting a shifting of the core body 12 in the direction of the plastic material of shrinking, with a fixing element in the shape of a screw 23 engaging into said slot 22, whereby when removing the injected casting from the mold the core body 12 remains in the mold and is manually returned toward the circumferential strips 5 of the mold; alternatively, a spring (not shown) can be provided caring for this return movement.

Figure 10:
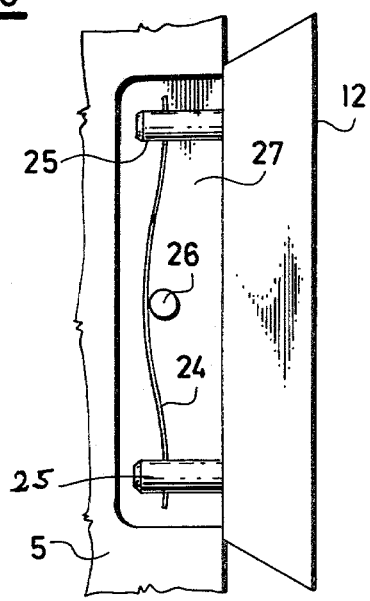
FIG. 10 is a view in section of a sixth alternative core of the mold provided with two fixing extensions.

According to FIG. 10 a core of the mold forms a dovetail recess on the side of the injected molding. The core comprises a mobile core body 12 provided with two fixing extensions 25 situated in a recess 27 of the circumferential strip 5. The fixing extension 25, for instance bolts, are mutually connected by a leaf spring 24. An abutting bolt 26 is provided in the center of the spring 24. Due to this design, the core is shifted in the direction of shrinking of the solidifying plastic material.

Figure 11:
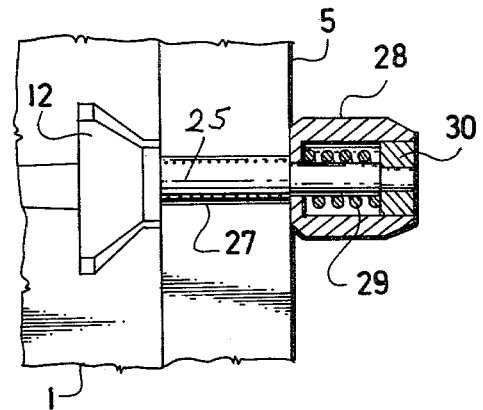
FIG. 11 is a view in section of a seventh alternative core of the mold the fixing extension of which is fixed outside the circumferential strip of the mold.

Another arrangement for forming a dovetail recess in a side wall is shown in FIG. 11. Such arrangement is disposed in the base plate 1 and in the circumferential strip 5 of the mold. The fixing extension 25 of the core body 12 is shiftably in a recess 27 of the circumferential strip 5 of the mold and its end is provided with a coil compression spring 29 situated in a sleeve 28 closed by a nut 30. The spring 29 maintains the core pressed against the circumferential strip 5 of the mold and permits movement of the core due to shrinking of the plastic material after the core has been surrounded by the melt.

Figure 12:
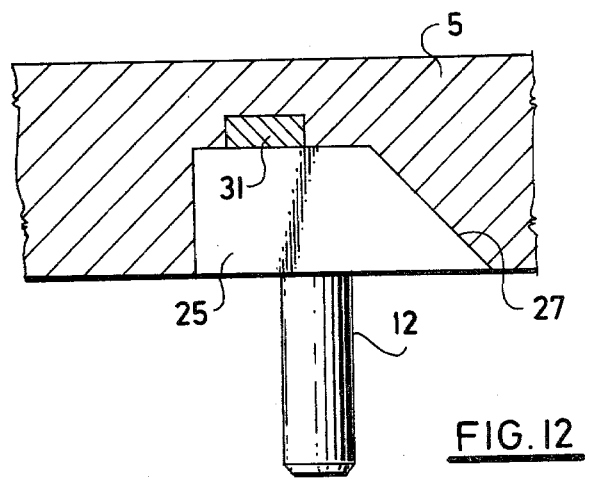
FIG. 12 is a view in section of an eighth alternative core of the mold, the fixing extension of which is represented by a magnet.

In FIG. 12 the core of the mold forms an opening in the wall of the injected casting. The core has a ferromagnetic fixing extension 25 of the core body 12 engaging in a recess 27 of the circumferential strip 5 of the mold. The shaped fixing extension 25 is fixed in the circumferential strip 5 of the mold by means of a permanent magnet 31 also disposed in the recess 27.

Figure 13:
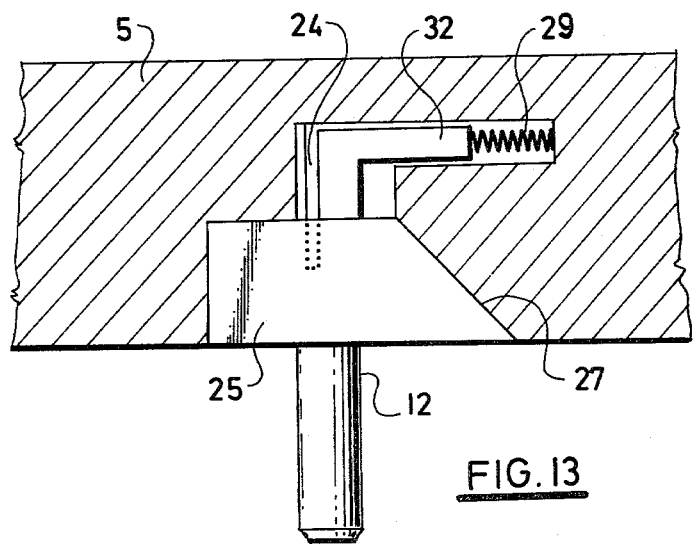
FIG. 13 is a view in section of a ninth alternative core of the mold, the formed fixing extension of which is provided with a spiral spring.

In the embodiment of FIG. 13 the fixing extension 25 is fixed in a recess 27 in the circumferential strip 5 of the mold by means of a holder 32 on which a steel spring 24 bears. The extremity of the holder 32 in the recess of the circumferential strip 5 is provided with a coil compression spring 29.

Although the invention is illustrated and described with reference to a plurality of preferred embodiments thereof, it is to be expressly understood that it is in no way limited to the disclosure of such a plurality of preferred embodiments, but is capable of numerous modifications within the scope of the appended claims.

We claim:

1. A mold for forming injection moldings of large dimensions and complicated surfaces from plastic material, comprising a pair of opposed metal base plates, spaced circumferential strips defining a mold cavity, cooling grids composed of tubes embedded in said base plates, shaped forming plates and forming strips removably fixed by fixing means to the internal surface of the base plates forming a part of the active surface of the mold, said active surface of the forming plates and forming strips, together with the surface of said fixing means which is flush with said forming plates, and the forming strips being provided with the required surface pattern, and mobile cores for the mold provided on parts of the mold.

2. A mold as in claim 1, wherein the lower surfaces of the shaped forming plates and the forming strips are provided with grooves to receive means for the control of heat conditions of different parts of the mold.

3. A mold as in claim 1, wherein the lower surfaces of the shaped forming plates and the forming strips are provided with grooves receiving an auxiliary cooling system.

4. A mold as in claim 1, comprising a fixing bolt provided within the mold cavity and fixed to the mold, a hollow core body slipped on said bolt, and wherein the diameter of the fixing bolt is smaller than the internal diameter of the hollow core body, leaving a space between them and permitting a shifting of the core body along the base plate of the mold.

5. A mold as in claim 4, comprising a resilient element provided between the fixing bolt and the hollow core body.

6. A mold as in claim 5, wherein the resilient element is made of rubber.

7. A mold as in claim 5, wherein the resilient element is a spring.

8. A mold as in claim 4, wherein the fixing bolt is a screw bolt with a washer under its screw head.

9. A mold as in claim 4, wherein the fixing bolt is situated in the hollow core body eccentrically in a direction opposite to the direction of shrinking of the cooling plastic material, and comprising a spring loaded distance bolt the end of which rests against the internal wall of the core body.

10. A mold as in claim 1, wherein the mobile core is fixed to the fixing bolt by a spring.

11. A mold as in claim 1, wherein the mobile core is suspended on a fixing bolt by a spring.

12. A mold as in claim 1, wherein the mobile core is supported by a resilient element resting against the edge of the mold.

13. A mold as in claim 4, wherein the mobile core is ferromagnetic and is maintained in its position by a permanent magnet.

* * * * *